United States Patent [19]

Maximovich et al.

[11] 4,172,862
[45] Oct. 30, 1979

[54] BLOCK POLYMER

[75] Inventors: Michael J. Maximovich; Robert T. Prudence, both of Akron, Ohio

[73] Assignee: The Goodyear Tire & Rubber Company, Akron, Ohio

[21] Appl. No.: 668,157

[22] Filed: Mar. 18, 1976

[51] Int. Cl.² .......................................... C08F 297/04
[52] U.S. Cl. ..................................................... 525/96
[58] Field of Search ............................. 260/879, 880 B

[56] References Cited

U.S. PATENT DOCUMENTS

| 3,567,798 | 3/1971 | Haefele | 260/880 B |
|---|---|---|---|
| 3,637,554 | 1/1972 | Childers | 260/880 B |
| 3,639,523 | 2/1972 | Hayter | 260/880 B |
| 3,644,322 | 2/1972 | Farrar | 260/880 B |
| 3,725,505 | 4/1973 | O'Malley | 260/880 B |
| 3,778,490 | 12/1973 | Hsieh | 260/880 B |
| 3,891,721 | 6/1975 | Prudence | 260/879 |
| 3,957,913 | 5/1976 | Roest | 260/880 B |

Primary Examiner—Paul R. Michl
Attorney, Agent, or Firm—J. D. Wolfe

[57] ABSTRACT

A block polymer of an alkyl vinyl aromatic compound, conjugated diolefins and an alkyl-vinylpyridine with the central poly(diolefin) segment being branched by copolymerization with divinyl benzene to give a composition having improved 100 percent modulus, usually from 400 to 1400 pounds per square inch.

7 Claims, No Drawings

BLOCK POLYMER

This invention relates to block polymers of alkyl vinyl aromatic compounds, conjugated diolefins and divinylbenzene, and a monomer selected from the class consisting of vinylpyridine and alkyl-vinylpyridines. More particularly, this invention relates to block polymers of styrene, butadiene, divinylbenzene and 2-vinylpyridine.

Linear, unbranched block polymers of styrene, butadiene and 2-vinylpyridine have relatively low modulus at 100 percent elongation and good compatability with other polymers. Since the modulus is low on this block polymer, the modulus of the blends of the block polymer and other compatible polymers is low, as well. This low modulus of the blends limits the utility of the block polymer and its blends.

The object of this invention is to provide block polymers of alkyl vinyl aromatic compounds, conjugated diolefin, divinylbenzene and a monomer of vinylpyridine or alkyl-vinylpyridine having a greatly improved 100 percent modulus and still having good compatability with thermoplastic polyurethanes.

This object and its advantages are obtained by polymerizing an alkyl vinyl aromatic compound having an alkyl radical of 0 to 12 and preferably 0 or one carbon atom with a lithium catalyst to produce a poly(vinyl alkyl aromatic compound) lithium of about 5,000 to 20,000 and preferably 14,000 to 18,000 molecular weight. Then a conjugated diolefin having 4 to 12 carbon atoms and divinylbenzene (hereinafter sometimes DVB) are polymerized with the poly(vinyl alkyl aromatic compound) lithium at a DVB to active lithium molar ratio of about two to 20 and preferably at four to seven to obtain branched polydiolefin blocks of 20,000 to 60,000 and preferably 30,000 to 50,000 molecular weight. This specimen is then polymerized with a monomer selected from vinylpyridine or alkyl vinylpyridine where the alkyl radical contains one to eight and preferably one or two carbon atoms to form polyvinylpyridine blocks of 2,000 to 20,000 and preferably 8,000 to 12,000 molecular weight before terminating the block polymer with the well known lithium terminators such as the alcohols. It is preferred to add a suitable antioxidant after or just before addition of the lithium terminator. The block polymer is recovered from the polymerization solvent and dried. These dry block polymers have 100 percent modulus of 400 to 1400 and preferably 900 to 1200 psi, are thermoplastic and compatible with thermoplastic polyurethanes, polyesters and other polar thermoplastic polymers.

The block polymers of this invention are made by sequentially contacting the monomers, vinyl alkyl aromatic compounds where the alkyl radical contains 0 or one to 12 carbon atoms, a mixture of a conjugated diolefin of four to 12 carbon atoms and DVB, and a monomer of vinylpyridine or alkyl-vinylpyridine where the alkyl radical contains one to six carbon atoms, with an organolithium catalyst in an inert solvent of either the aliphatic or the aromatic type.

Examples of the vinyl alkyl aromatic compound or monomer are styrene, α-methyl styrene, vinyl toluene, p-tert-butyl styrene and related alkyl vinyl benzenes, usually containing an alkyl radical of 0 to about 20 carbon atoms. Examples of the conjugated diolefins are butadiene, isoprene and dimethyl butadiene. The vinylpyridines can have the vinyl group in the two, three or four position and examples of the alkyl-vinylpyridines are 4-ethyl-2-vinylpyridine and related compounds where the alkyl radical, for example, is methyl, ethyl, propyl or butyl.

The organolithium catalysts useful in the practice of this invention are any that correspond to the formula R-Li in which R is selected from the group consisting of alkyl, cycloalkyl, aryl, alkylaryl, and arylalkyl. Representative of the compounds corresponding to the formula set forth are isopropyl lithium, tertiary octyl lithium, n-decyl lithium, naphthyl lithium, 4-butylphenyl lithium, methyl lithium, ethyl lithium, n-butyl lithium, secondary butyl lithium, amyl lithium, hexyl lithium, p-tolyllithium, 4-phenylbutyllithium, cyclohexyl lithium, 4-butylcyclohexyllithium, 4-cyclohexylbutyllithium, 2-ethylhexyllithium, allyllithium, phenyllithium and the like.

The amount of organolithium catalyst used in the practice of this invention cannot be specifically set down since the amount of catalyst used depends on the desired molecular weight of the polymer. What can be said is that a catalytic amount is necessary for polymerization. As a general rule the molecular weight of the polymer is equal to the grams of polymer formed divided by the mols of organolithium catalyst employed. Thus, one skilled in the art can adjust the catalyst level to get any desired molecular weight polymer, so long as the DVB to active lithium ratio of about two to 20 is maintained.

The polymerization reaction is usually carried out in an inert solvent such as a hydrocarbon, preferably propane, isobutane, pentane, isooctane, cyclopentane, cyclohexane, benzene, toluene or xylene, or a mixture of solvents. An inert gas such as argon or nitrogen is used to displace terminating contaminents such as oxygen, carbon dioxide, carbon monoxide, water vapor and the like. This type of polymerization system results in what is called a living polymer. By the term "living polymer" is meant that the polymerization has no termination or transfer reactions so that the polymer chains have lithium atoms attached to the chain end even when all the monomer is consumed. If additional monomer is added, the polymerization will continue with the new monomer adding on to the already existing chains until it also is consumed.

The order of monomer addition is important in that the 2-vinylpyridine must be the last monomer added in the incremental addition procedure. The alkyl vinyl aromatic compound, for instance, styrene must be contacted with the organolithium catalyst first, the mixture of butadiene and DVB is added and then the 2-vinylpyridine must be added last in order to produce the block polymers of this invention.

The polymerization reactions are usually carried out at temperatures from about 0° C. to about 100° C. The polymerization reaction is preferably carried out between 30° C. and 80° C.

The practice of this invention is further illustrated by reference to the following representative and illustrative examples which are intended to be representative rather than restrictive of its scope and where all parts and percentages are by weight unless otherwise indicated.

EXPERIMENTAL

Example I

A premix of 510 grams of styrene in 2440 cc. of cyclohexane was passed down a silica column under nitrogen pressure. After nitrogen sparging the polymerization vessel contained 480 grams of styrene. Under a blanket of nitrogen, 34 cc. (2.0 ml. scavenger) of 0.93 N. secondary BuLi was added to the premix solution. After sealing and shaking the vessel it was placed in a cold-water bath to moderate the exotherm. After three hours in the water bath, the catalyst (polystyryl lithium) was allowed to stand at least 24 hours at room temperature.

A premix of 1361 grams of butadiene in 5443 grams of cyclohexane was passed down a silica column under nitrogen pressure to purify it. To a polymerization vessel was added all of this purified premix solution together with 47 cc. DVB (55 percent) in cyclohexane. After nitrogen sparging, the reactor contained 1082 grams of butadiene and 0.177 mols DVB and required scavenger of 4 cc. of 0.93 N. secondary BuLi. After the scavenger was added, the premix solution was catalyzed with the previously prepared polystyryl lithium of molecular weight 16,000. After 60minutes at 65° C. the polymerization vessel was cooled to 50° C. and a cyclohexane solution containing 300 grams of 2-vinylpyridine was added to the polymerization mixture. After one hour at 50° C. the reaction was killed with one part per hundred (phr) of methanol containing one phr of a phenolic antioxidant. After a preliminary drying at room temperature for 24 hours, the polymer was dried at 50° C. under reduced pressure for 24 hours. Yield was 1652 grams (89%) having a DSV (toluene) 1.60 and gel 28.8 percent.

Additional physical properties are listed in Table 1:

Table 1

| | |
|---|---|
| 100% Modulus, psi | 821 |
| 300% Modulus, psi | 1540 |
| Elongation at break, % | 400 |
| Tensile at break, psi | 1911 |
| Tear strength, psi | 439 |
| Low temp. torsion, Inflection Pt. ° C. | −95 |
| Tension Set, % | 16 |
| Shore A hardness | 89 |

Test samples were molded at 300° F. for 20 minutes and cooled under pressure.

On a smaller scale a series of identical polymers was prepared in which the DVB/organolithium mol ratio was raised from 5/1 through 9/1. Some physical properties for this series are listed in Table 2:

Table 2
Physical Properties of the Molded Polymer*

| Run | DVB/Li Mole Ratio | DSV | Gel % | Modulus psi 100% | Modulus psi 300% | E** | T*** | Shore A Hardness |
|---|---|---|---|---|---|---|---|---|
| A | 0 | 0.67 | 3.0 | 322 | 480 | 900 | 4030 | 84 |
| B | 5 | 1.25 | 2.5 | 570 | 1045 | 680 | 3975 | 89 |
| C | 6 | 1.28 | 2.3 | 441 | 850 | 650 | 3900 | 87 |
| D | 7 | 1.30 | 2.3 | 620 | 1300 | 510 | 2920 | 92 |
| E | 8 | 1.43 | 6.9 | 910 | 1470 | 430 | 2120 | 92 |
| F | 9 | 1.47 | 5.8 | 920 | 1700 | 300 | 1700 | 93 |

The above Test Samples were molded at 300° F./20 minutes and cooled rapidly under pressure before modulus, tensile, elongation and hardness was run.
*These polymers had a polystyrene block of about 16,000 molecular weight, a polybutadiene block of about 40,000 molecular weight and a poly(-2 vinyl pyridine) block of about 10,000 molecular weight.
**Elongation at break, %.
***Tensile at break, psi.

Other branched block polymers within the scope of this invention can be readily produced by substituting the appropriate monomer in the above described polymerization procedure. For instance, vinyl toluene, a mixture of butadiene and DVB, and vinylpyridine can be used to produce thermoplastic polymers having improved modulus and readily compatible with other thermoplastic polymers such as polyurethanes.

While certain representative embodiments and details have been shown for the purpose of illustrating the invention, it will be apparent to those skilled in this art that various changes and modifications may be made therein without departing from the spirit or scope of the invention.

What is claimed is:

1. A thermoplastic block polymer of alkyl vinyl aromatic compound having an alkyl radical containing 0 or one to 12 carbon atoms, a conjugated diolefin of four to 12 carbon atoms and a monomer selected from the class of vinylpyridine and alkyl-vinylpyridine, where the alkyl radical contains one to eight carbon atoms with the central poly(diolefin) segment being branched by copolymerization with divinyl benzene.

2. The thermoplastic block polymer of claim 1 wherein the alkyl vinyl aromatic compound is an alkyl vinyl benzene, the diolefin is butadiene and the vinylpyridine monomer is 2-vinylpyridine.

3. The thermoplastic block polymer of claim 2 where the alkyl vinyl benzene is styrene.

4. The polymer of claim 3 wherein the polybutadiene segment has a molecular weight of 20,000 to 60,000, the polystyrene segment has a molecular weight of 5000 to 20,000 and the poly-2-vinylpyridine segment has a molecular weight of 2,000 to 20,000.

5. The polymer of claim 1 wherein the alkyl vinyl aromatic compound is vinyl toluene.

6. The polymer of claim 1 wherein the conjugated diolefin is isoprene.

7. The polymer of claim 1 wherein the vinyl alkyl pyridine is 4-ethyl-2-vinylpyridine.

* * * * *